Aug. 5, 1952    T. ARMSTRONG    2,605,824
WINDOW BLIND
Filed May 3, 1950    5 Sheets-Sheet 1
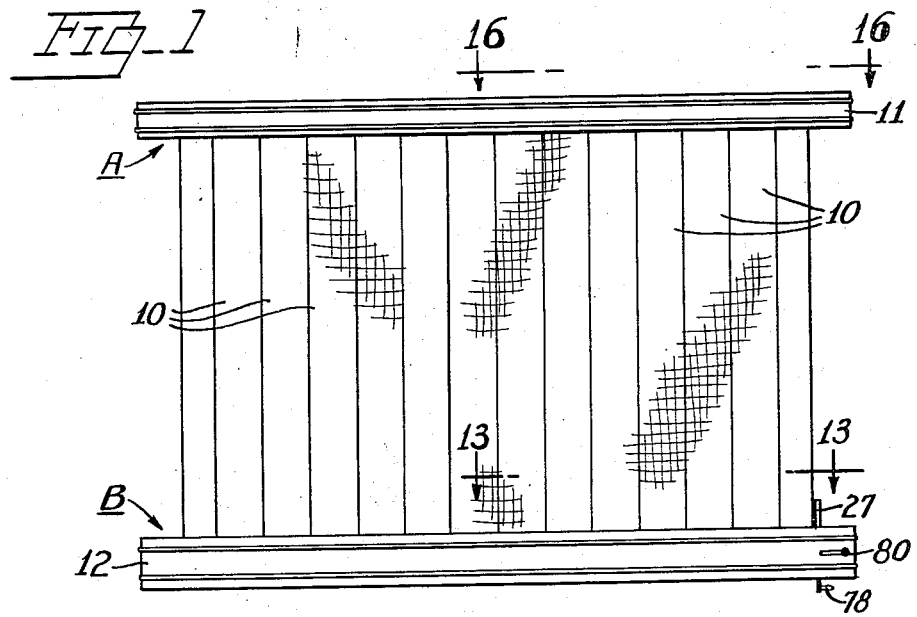
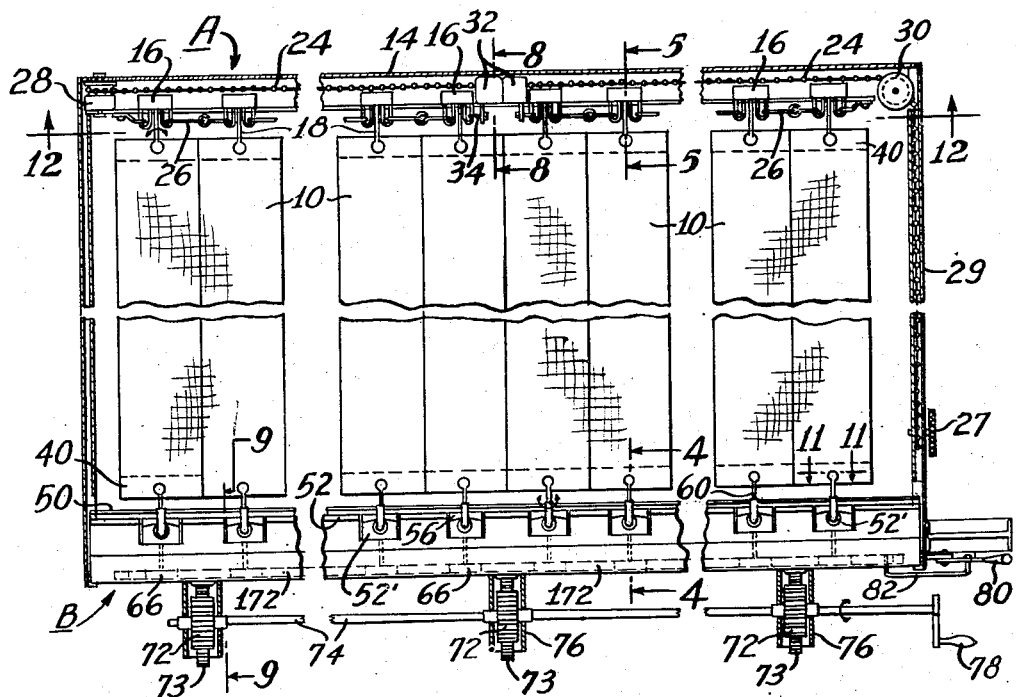
INVENTOR
*Thomas Armstrong*
BY
*Charles H. Brown*
ATTORNEY Aug. 5, 1952 — T. ARMSTRONG — 2,605,824
WINDOW BLIND
Filed May 3, 1950 — 5 Sheets-Sheet 2
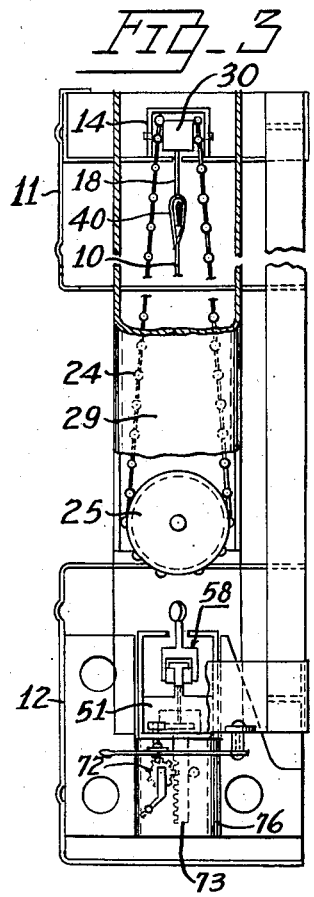
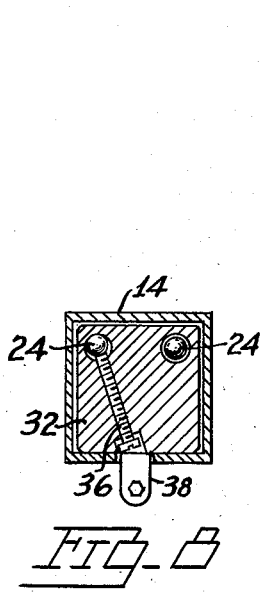
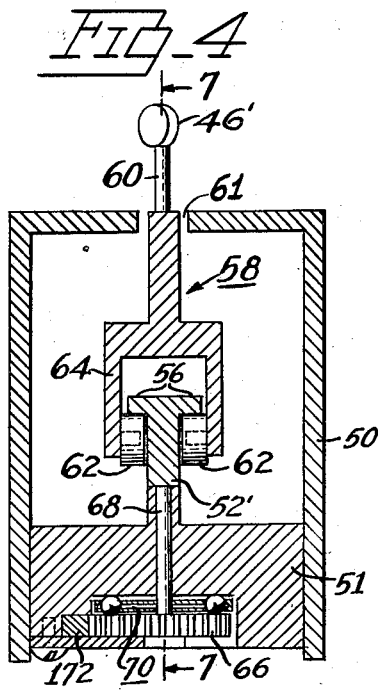
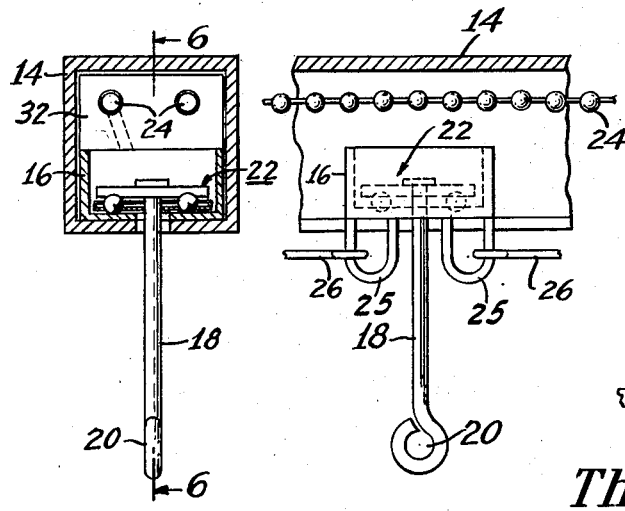
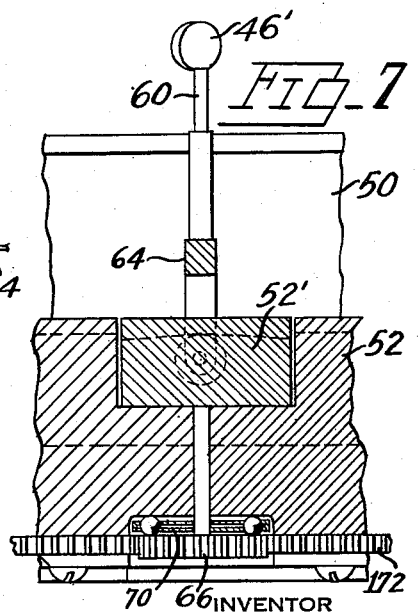
INVENTOR
Thomas Armstrong
BY Charles H. Brown
ATTORNEY Aug. 5, 1952     T. ARMSTRONG     2,605,824
WINDOW BLIND
Filed May 3, 1950     5 Sheets-Sheet 3
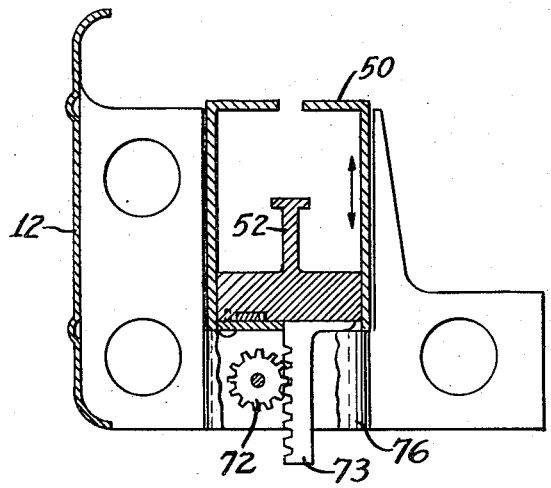
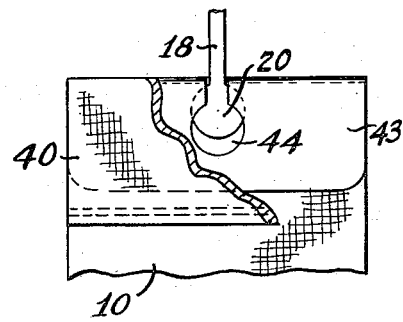
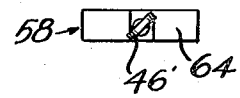
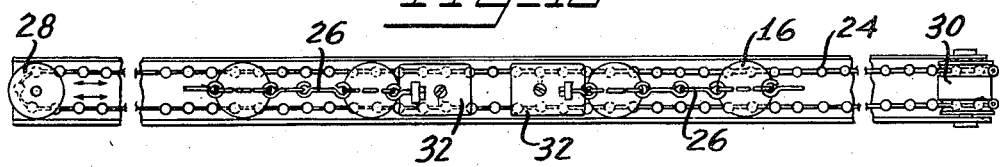
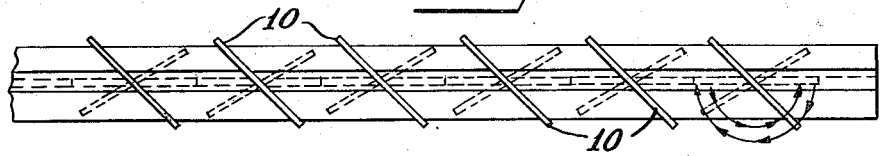
INVENTOR
*Thomas Armstrong*
BY
*Charles H. Brown*
ATTORNEY Aug. 5, 1952 T. ARMSTRONG 2,605,824
WINDOW BLIND
Filed May 3, 1950 5 Sheets-Sheet 4

INVENTOR
*Thomas Armstrnog*
BY
Charles H. Brown
ATTORNEY

Aug. 5, 1952 — T. ARMSTRONG — 2,605,824
WINDOW BLIND
Filed May 3, 1950 — 5 Sheets-Sheet 5

INVENTOR
*Thomas Armstrong*
BY
*Charles H. Brown*
ATTORNEY

Patented Aug. 5, 1952

2,605,824

UNITED STATES PATENT OFFICE 2,605,824

WINDOW BLIND

Thomas Armstrong, Oakville, Ontario, Canada, assignor to Ruth Armstrong

Application May 3, 1950, Serial No. 159,696

20 Claims. (Cl. 160—168)

This invention relates to improvements in light controlling screens of the window blind type, and particularly to such screens having vertically arranged louvers or shutters.

An object of the invention is the provision of a novel, efficient and highly attractive screen construction of the foregoing type which may be conveniently disposed to variably intercept a window opening.

Another object is to provide an adjustable window blind type of screen whose louvers are suspended vertically and capable of movement along the arc of a circle within guideway means.

A further object is the provision of a window blind whose individual louvers are made up of lengths of fabric so suspended in guideways that they can be made to swing more or less freely for movement across the window opening, to thereby collapse the blind, or held taut to control the light and air without removing them from their position intercepting the window opening.

Briefly, the window blind of the invention comprises a series of vertically arranged louvers supported between upper and lower horizontally positioned guideway assemblies. Each louver may consist of a length of cloth attached to the guideway assemblies by means of rigid but removable inserts in hems at both ends of the cloth. The louvers are pivotable from one end by individual gears which are simultaneously controlled by a rack mounted in one of these guideway assemblies and engaging all the aforesaid gears. Each louver is rotatably mounted in the other assembly at the end opposite the gear by means of a bearing construction. An adjustable lift rack on one of the guideway assemblies, in one position enables the louvers to be maintained taut, thereby permitting simultaneous tilting or pivotal movement of the louvers on their respective vertical axes, while in another position the lift rack enables the louvers to be suspended more or less freely, thereby permitting collapse of the blind, at the option of the operator. A bead chain looped over pulleys, wheels or rollers positioned at both ends of one of the guideway assemblies and fastened to the two centrally positioned louvers controls the collapse of the blind to both sides of the window. Half the number of louvers on one side of blind are linked together at one end through collapsing links, while the other half of the louvers on the other side of the blind are also linked together through collapsing links.

A feature of the invention is the guideway assembly construction which controls the tilting or pivotal rotational movement of the louvers on their vertical axes. Each louver has individual thereto an actuator gear responsive to movement of a common actuator rack for pivotally moving an actuator or tilter element. This actuator or tilter element is in the form of a T-track having arcuate-like oppositely disposed flanges which slope inwards to a central point. In order to secure the end of the louver to the actuator element, there is provided a grip having a tab at one end for coupling to the louver and a pair of rollers at the other end for riding on the flanges of the tilter element. This T-track actuator element is movable in a vertical direction by the lift rack. When the rollers of the grip are at dead center on the sloping flanges, the downward movement of the actuator element holds the louver in a taut condition.

Other objects and features will appear from a reading of the following description. An illustrative embodiment is shown in the accompanying drawings, wherein Fig. 1 is an elevation view of the window blind of the invention;

Fig. 2 is an elevation view with the upper and lower face moldings removed;

Fig. 3 is an end view of the right hand end of the blind shown in Fig. 2;

Figs. 4, 5, 8 and 9 are sectional views of Fig. 2 along the respective lines, 4—4, 5—5, 8—8 and 9—9;

Fig. 6 is a sectional view of Fig. 5 along the line 6—6;

Fig. 7 is a sectional view through Fig. 4 along the line 7—7;

Fig. 10 is a view showing either end of the vertical cloth louver, partly cut away to illustrate the manner of attachment to the upper and lower assemblies;

Fig. 11 is a top or plan view of the louver grip taken along the line 11—11 of Fig. 2;

Fig. 12 is a view taken along the line 12—12 of Fig. 2, looking up on the upper assembly;

Fig. 15 is a view of Fig. 14 along line 15—15, looking up;

Throughout the figures of the drawing, the same parts are represented by the same reference numerals.

Figure 13:
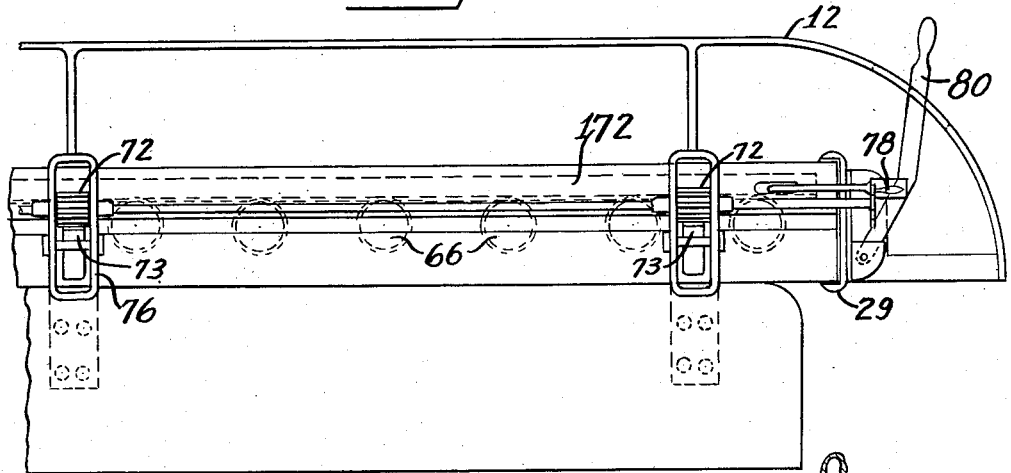
Fig. 13 is a view taken along the line 13—13 of Fig. 1, showing the effective 180° range of positions which the louvers can take in response to movement of the actuator rack.

Referring to the drawings in more detail, the window blind of the invention comprises upper and lower horizontally positioned channeled guideway assemblies A and B respectively, concealed by face mouldings 11 and 12, for supporting and moving a series of vertically positioned louvers or shutters 10.

The louvers, in the closed position of the blind, abut each other at their adjacent edges as shown in Figs. 1 and 2. Each louver comprises a length of cloth and extends between a longitudinally shiftable carrier element 16 in the upper assembly and an actuator element 52' in the lower assembly. The cloth louvers 10 are each provided at opposite ends with hems 40 through which are inserted folded-over metallic inserts 43. Note Fig. 10. These inserts 43 slide into the hems from the open ends thereof, and have holes 44 registering with correspondingly positioned holes in the hems. The upper end of the louver is supported from the shiftable carrier 16 by means of an eye or apertured tab 20 fastened to the pivoting pin or shaft 18. The tab 20 projects into the hem and insert as shown in Figs. 2 and 10. The lower end of the louver is similarly secured to a grip element 58 in turn associated with the actuator 52', by means of a tab 46' at the end of a pin 60 of the grip. Note Figs. 2, 4 and 7.

The upper guideway assembly includes a horizontally positioned channel 14 along the bottom of which is provided a longitudinally extending slotway. Note Figs. 3 and 5. Within channel 14 are mounted carrier elements 16 for causing the louvers to collapse, a bead chain 24, pulley wheels or rollers 28 and 30 at both respective ends thereof and associated means for enabling movement of the louvers.

The shiftable carrier elements 16 are shown in detail in Figs. 5 and 6, and each comprise a slidable housing mounted in the upper slotted channeled guideway 14. The carrier 16 includes a pivoting pin 18 one end of which is supported by thrust bearing 22 and the other end of which terminates in the tab or eye 20 for supporting a louver 10. The thrust bearing is of a type well known in the art and includes the usual pivot cap, pivot roller bearing balls and ball locator plates. The carrier 16 is provided with a pair of hooks 25 at the bottom thereof to which are fastened collapsible or flexible links 26 for coupling to the adjacent carriers. In this way the carriers (and also the louvers) are successively linked one to another. The two centrally located carriers, however, are each provided with a collapsible link 26 on one side and a fixed link 34 on the other side. The fixed links 34 couple the central two carriers to shiftable anchoring or locator blocks 32. Note Fig. 2. It will thus be seen that longitudinal movement of any one louver 10, such as the central louver, caused by movement of an anchoring element 32, will cause movement in the corresponding direction of the other louvers 10, provided of course, the lower ends of the louvers are free to move in the lower guideway assembly.

For transmitting longitudinal movement to the louvers 10, there is provided the bead or ball chain 24 which loops over the pulley wheels or rollers 28 and 30 at opposite ends of the slotted channeled guideway 14 and also loops over the ball chain sprocket 25 at the right hand end of the window blind. Note Figs. 2, 3 and 12. The bead chain at the right hand end of the window blind extends in a vertical direction and is normally concealed by a channel member 29. The sprocket 25 is driven by an operating crank or knurled knob 27. Obviously, the knob 27 can be replaced by a lever. The pulley wheel 28 has a vertical axis and is provided with a single groove, while pulley wheel 30 has a horizontal axis and is provided with two grooves over which the bead chain is looped. Note Fig. 12. One end of the bead chain is fastened to one shiftable anchoring or locating block 32, while the other end of the bead chain is fastened to the other shiftable anchoring or locating block 32, as shown in detail in Fig. 12. The manner of fastening the bead chains to the shiftable anchoring or locating blocks is shown in Fig. 8. Each shiftable locating block 32 is provided with a pair of spaced longitudinally arranged holes through which freely pass the two parallel runs of the chain 24, and also provided with a bracket 38 to which the fixed link 34 is secured.

A lock screw 36 is used in each locating block 32 to engage at one end the bead chain 24. By tightening the lock screw 36, the bead chain is tightly secured to the anchoring or locating block. The lock screw 36 in one locating block engages one parallel run of the bead chain, while the lock screw in the other locating block engages the other parallel run of the bead chain.

The arrows in Fig. 12 indicate the two directions of movement of the bead chain within the slotted channeled guideway 14.

The lower guideway assembly B includes a horizontally positioned channeled guideway 50 having a longitudinally extending slotway 61. It should be noted that slotway 61 of the lower channeled guideway 50 faces upward and confronts the slotway of the upper channeled guideway 14. The base of the lower guideway 50 is solid, as at 51. Note Figs. 4 and 7. The lower guideway 50 is provided with a pair of vertically extending outer side sections and an intermediate section 52 which is parallel to the side sections. The intermediate section 52 is in the form of a T-track having flanges disposed on opposite sides of the upright stem of the T. This T-track of the section 52 is provided with equal length cut-out portions symmetrically positioned along its length, as shown in Figs. 2 and 7.

In these cut-out portions of the channeled guideway 50 are positioned actuator elements for controlling the tilting or pivotal rotational movement of the louvers 10 on their vertical axes. Each louver has individual thereto an actuator element. Each actuator includes a T-track 52' having arcuate-like oppositely disposed flanges 56 which slope inwards to a central point. Note Figs. 2, 4 and 7. The T-track 52' of the actuator is, except for the arcuate-like arrangement of the flanges, similar in dimensions to the T-track of the intermediate section 52 of the lower channeled guideway 50. The lower end of the T-track of each actuator is provided with a vertical shaft 68 which passes through a bore in the base 51 of the guideway and is secured to the actuator gear 66, via a thrust bearing 70. It will thus be seen that movement of an actuator gear 66 will, in turn, cause rotational movement of its associated actuator 68, 52', 56 within the cut-out portion of the section 52. The actuators are separately coupled to their respective louvers 10 by means of grip devices 58, there being one grip device for each actuator. Each grip device 58 includes a U-shaped arrangement 64 the base of which is coupled through a pin 60 and a tab 46' to the lower end of the louver 10, and the other end of which is provided with rollers 62 engaging the bottom surfaces of the shoulder-like flanges 56 of the T-track of the actuator. Note Figs. 2, 4 and 7. The tab 46' of the grip device 58 is positioned at an angle to the base of the U-shaped arrangement 64, as shown in Fig. 11, in order to furnish a desired wide range of movement of the louver 10, to thereby enable a complete closure of the louvers in one position or maximum opening of the louvers to the maximum extent in another position. Any movement of the actuator in response to movement of the associated actuator gear 66, will in turn communicate a corresponding movement to the louver through the grip device 58, thus providing any desired degree of tilt or rotational movement for the louver around its vertical axis.

When the actuators have their T-tracks aligned in the same straight line with the T-track of the intermediate section 52 of the channeled guideway 50, the rollers of the grip devices are able to move off their respective actuator tracks onto the section 52, thereby enabling collapsing of the window blind, under certain conditions, in response to a movement of the bead chain 24, as will appear later.

Figure 14:
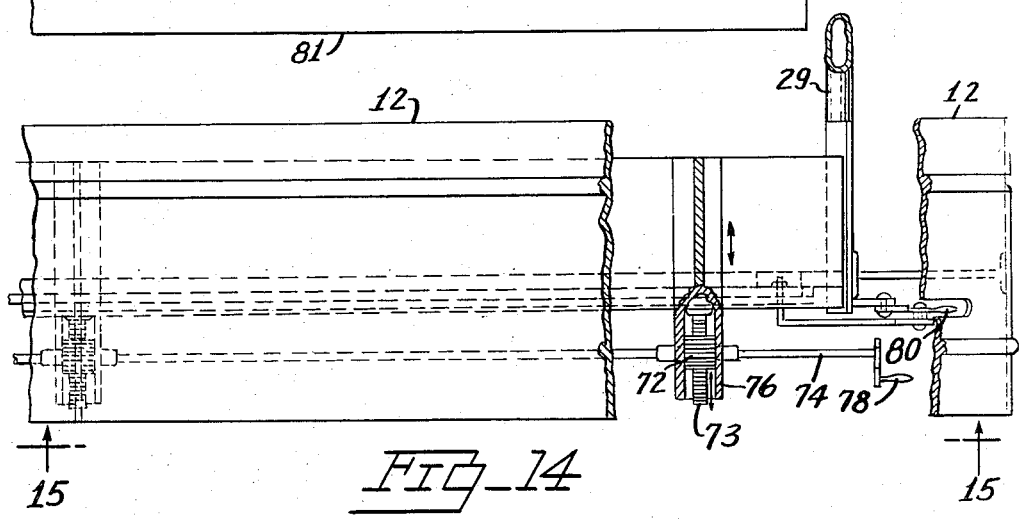
Fig. 14 is an enlarged elevation of the right hand side of the front lower guideway assembly with certain parts removed.

The actuator gears are uncontrolled by a horizontally positioned actuating rack 172 simultaneously engaging all of the actuating gears 66. The common actuating rack 172 is controlled by a lever 80 through a suitable link 82. Note Figs. 2, 14 and 15.

The louvers are held taut when the rollers 62 of the grip devices are in the centers of their respective actuator and the actuators are forced downward; that is, pressure exerted on them in a downward direction. This taut condition can be fulfilled at any desired tilting or pivotal position of the louvers. The louvers are enabled to collapse and move to both sides of the window blind (in response to movement of the knurled knob 27), only when the rollers 62 of the grip devices can freely move over the T-tracks of their respective actuators and onto the T-track of the intermediate section 52 of the lower channeled guideway 50. This last condition is satisfied only when no downward pressure is exerted upon the actuators.

To enable the louvers to be held taut or freely movable for collapsing, there are provided a plurality of lift pinions or gears 72 under control of a common torsion shaft 74, in turn, controlled by movement of a lever 78. The two directions of rotational movement of the torsion shaft 74 are shown by the curved bidirectional arrow in Fig. 2. Each lift gear 72 is mounted in a suitable housing 76 and individually engages a lift rack 73. Note Figs. 2, 3, 9, 14 and 15. Hence, any movement of lever 78 will move the entire lower channeled guideway 50 together with its gear and actuator elements in a vertical direction, up or down as the case may be, at the option of the operator.

Figure 16:
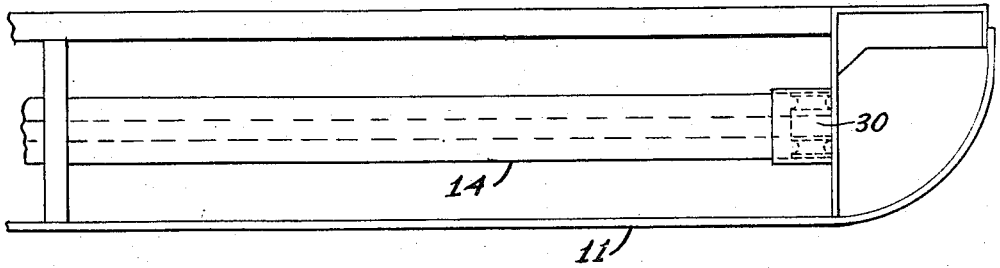
Fig. 16 is an enlarged view of part of the upper guideway assembly taken along line 16—16 of Fig. 1.

The window blind can be affixed to a window frame at the top and bottom guideway assemblies by suitable brackets such as shown in Figs. 9 and 16.

If desired, the actuators, actuating gears, shiftable carriers, pulley wheels, and bead chain can be arranged in the upper channeled guideway, while a freely pivotal support for the louvers and a gear lift arrangement can be positioned in the lower channeled guideway. In such case, a series of three gears for controlling movement of the common actuating rack can be positioned at one end of the upper channeled guideway under control of a vertically arranged rod in turn, controlled by a lever positioned at the right hand end of the window blind.

In the operation of the window blind of the invention, let it be assumed that the louvers are in the position shown in Figs. 1 and 2, in which condition, the rollers 62 of the grip devices 58 are in the centers of the arcuate-like flanges 56 of the actuators. With the lever 78 turned in a counter-clockwise direction, the lift gears 72 will exert downward pressure on the lower guideway assembly and on the various actuators. The louvers will be held taut, and movement of the common actuator rack 172 via the lever 80 will provide any desired degree of tilt or pivotal movement for all of the louvers, simultaneously. In order to collapse the window blind, the lever 78 is turned in a clockwise direction, thereby causing the lift gears 72 to raise the lower guideway assembly and relieve all pressure on the actuators. The rollers 62 of the different grip devices 58 may then roll off the T-tracks of their respective actuators and onto the similarly dimensioned T-track of the intermediate section 52 of the lower guideway assembly in response to movement of the louvers 10, in turn responsive to movement of the bead chain 24. Movement of the knurled knob 27 will impart motion to the bead chain 24. The two central louvers, because of their coupling to the anchoring or locator blocks 32, will move in opposite directions and carry with them the other louvers. As previously mentioned, the locator blocks are connected to the louver carriers 16 through the collapsible links 26. Movement of the knob 27 in one direction will open the blind, while movement of the knob 27 in an opposite direction will close the blind.

Figure 17:
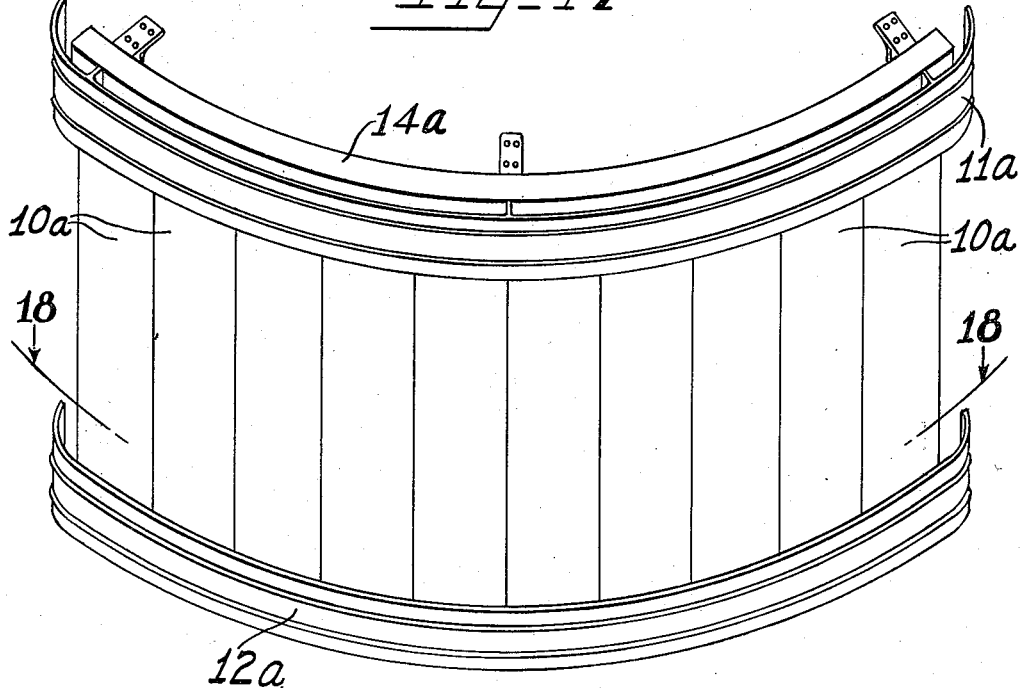
Fig. 17 shows the blind of the invention used on a curved window, in which the blind moves along an arc of a circle at both ends.
Figure 18:
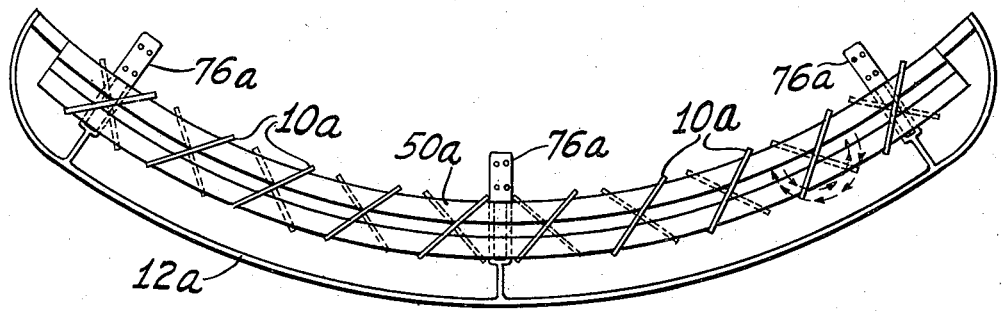
Fig. 18 shows a cross-section of Fig. 17 along the line 18—18.

Among the many advantages of the invention are: The louvers are each individually and easily detached to the supporting and actuating mechanism by a simple movement, without interfering with the other louvers, thereby permitting individual exchange or replacement thereof; The vertical position of the louvers collects less dust than horizontally positioned louvers, and facilitates thorough cleansing when required; The window blind can be used on curved windows to move along the arc of a circle, merely by arranging the upper and lower assemblies to be curved as shown in Figs. 17 and 18. In these figures the parts corresponding to those of the straight blind have been given the same reference characters but with prime designations added thereto. The lower channeled guideway would then be curved along with the actuator T-tracks, actuator rack etc. at only the end portions of the blind which extends along the arc of the circle; The angular position of the tab of the grip device relative to the U-shaped arrangement enables a positive control of the louvers and a wide range of tilting or pivotal movement of the louvers; and the window blind provides an extremely attractive appearance. Both sides of the louvers can be differently colored, thereby providing a choice of colors on opposite sides of the blind.

What I claim is:

1. A window blind comprising upper and lower horizontally positioned channeled guideways adapted to be mounted across a building opening to be served by the blind, said blind having vertically arranged louvers positioned between said guideways and turnable about their vertical axes, means in one of said channeled guideways for pivotally moving all of said turnable louvers of said blind, said means including an actuating gear for each louver, a horizontally movable link between each louver and its associated actuating gear, and a common rack similarly engaging the actuating gears of said louvers for rotating all of said louvers in the same direction, said horizontally movable links enabling said louvers to move in a horizontal direction to thereby collapse said blind.

2. A window blind comprising upper and lower horizontally positioned channeled guideways adapted to be mounted across a building opening to be served by the blind, said blind having vertically arranged louvers positioned between said guideways and turnable about their vertical axes, means in one of said channeled guideways for pivotally moving said louvers, a horizontally positioned actuating gear for each louver, a horizontally extending rack extending only on one and the same side of and engaging all of said actuating gears, an actuator element individual to each louver and controlled by the associated actuating gear thereof, and a pivoting device linking one end of each louver with its associated actuator element, said pivoting devices being movable horizontally to enable said louvers to move horizontally to thereby collapse said blind.

3. A window blind comprising upper and lower horizontally positioned channeled guideways adapted to be mounted across a building opening to be served by the blind, said blind having vertically arranged louvers positioned between said guideways and turnable about their vertical axes, means in one of said channeled guideways for pivotally moving said louvers, said means including an actuating gear for each louver and a common rack engaging the actuating gears of said louvers, each louver being coupled to its actuating gear through a louver pivoting device and a rotatable actuator element, said actuator element being in the form of a T-shaped track having flanges disposed on opposite sides of the upright stem of the T, said pivoting device having a grip at one end for engaging the louver and a pair of spaced rollers at the other end for engaging said flanges, said one channeled guideway comprising a centrally raised track having spaced cut-out portions for accommodating the actuator elements associated with the different louvers, the T-shaped tracks of said actuator elements being in one position thereof aligned with the track of said one channeled guideway for enabling the rollers of the different pivoting devices to travel over said one channeled guideway to thereby collapse said blind.

4. A window blind in accordance with claim 3, characterized in this, that said flanges are arcuate-like in shape with the central portion at a different horizontal position relative to the end portions of the flange.

5. A window blind in accordance with claim 3, wherein the flanges of the acuator element are of generally arcuate formation with the central portion raised relative to the end portions of the flange.

6. A window blind comprising upper and lower horizontally positioned channeled guideways adapted to be mounted across a building opening to be served by the blind, said blind having vertically arranged louvers positioned between said guideways and turnable about their vertical axes, means in one of said channeled guideways for pivotally moving said louvers, said means including an actuating gear for each louver and a common horizontally movable rack engaging the actuating gears of said louvers, and a plurality of other gears spaced along the length of said one channeled guideway, vertically arranged racks secured to the outside of said one channeled guideway and engaging said last gears for raising and lowering said one channeled guideway, and means for simultaneously controlling said last gears.

7. A window blind comprising upper and lower horizontally positioned channeled guideways adapted to be mounted across a building opening to be served by the blind, said blind having vertically arranged louvers positioned between said guideways and turnable about their vertical axes, means in one of said channeled guideways for pivotally moving said louvers, said means including an actuating gear for each louver and a common rack engaging the actuating gears of said louvers, each louver being coupled to its actuating gear through a louver pivoting device and an actuator element, said actuator element being in the form of a T-shaped track having flanges disposed on opposite sides of the upright stem of the T, said pivoting device having a grip at one end for engaging the louver and a pair of spaced rollers at the other end engaging the underside of said flanges, the flanges of each actuator element being of generally arcuate formation and co-extensive in length, said one channeled guideway comprising a centrally raised track having spaced cut-out portions for accommodating the actuator elements associated with the different louvers, the T-shaped tracks of said actuator elements being in one position thereof aligned with the track of said one channeled guideway for enabling the rollers of the different pivoting devices to travel over said one channeled guideway to thereby collapse said blind, and means for raising and lowering said actuating gears and pivoting devices as a single unit.

8. A window blind comprising upper and lower horizontally positioned channeled guideways adapted to be mounted across a building opening to be served by the blind, said blind having vertically arranged louvers positioned between said guideways and turnable about their vertical axes, means in one of said channeled guideways for pivotally moving said louvers, said means including a multi-tooth actuating gear for one end of each louver and a control element engaging the teeth of all of said actuating gears in similar manner, and pivotal means within said other channeled guideway for supporting the other ends of said louvers, said pivotal means being slidable in a horizontal direction in said other channeled guideway to enable collapse of said blind.

9. A window blind comprising upper and lower horizontally positioned channeled guideways adapted to be mounted across a building opening to be served by the blind, said blind having vertically arranged louvers positioned between said guideways and turnable about their vertical axes, means in one of said channeled guideways for pivotally moving said louvers, said means including a multi-tooth actuating gear for one end of each louver and a control element engaging the teeth of all of said actuating gears, and means for pivotally mounting the other ends of said louvers in said other channeled guideway, said last means including a thrust bearing for each louver mounted in said other channeled guideway, horizontally movable elements linked to both ends of said louvers for enabling horizontal movement of said louvers and collapse of said blind, and manually operable means linked to the horizontally movable elements located at one end of said louvers for imparting horizontal motion to said louvers.

10. In a window blind having vertically arranged louvers which are pivotal about their vertical axes, means for maintaining said louvers either taut or limp at the option of the operator, said means comprising an actuator element coupled to one end of each louver through a linking device, said actuator being in the form of a T-shaped track having flanges disposed on opposite sides of the upright stem of the T, said flanges being of generally arcuate shape, said linking device having a pair of spaced rollers engaging the underside of said flanges, and manually operable means, including a handle, linked to all of said actuator elements for simultaneously raising or lowering the same.

11. In a window blind having vertically positioned louvers, a T-shaped track having flanges disposed on opposite sides of the central stem of the T, said flanges gradually sloping inward towards the center of the T, a grip device having one end adapted to control the longitudinal movement of a louver and the other end provided with a pair of spaced rollers engaging the underside of said flanges, and means for moving said T-shaped track in a vertical direction toward or away from the louver to be controlled.

12. In combination, a T-shaped track having flanges disposed on opposite sides of the central stem of the T, said flanges gradually sloping inward towards the center of the T, a grip device having one end adapted to control the longitudinal movement of an element and the other end in the form of a U with spaced rollers at the terminations of the legs of the U engaging the underside of said flanges, and means for moving said T-shaped track toward or away from the element to be controlled along the longitudinal axis thereof.

13. A combination as defined in claim 12, wherein said one end of the grip device is flattened in a plane at an angle to the base of the U.

14. A window blind having vertically arranged louvers, a channeled guideway for said louvers, said guideway having side sections and a central section parallel to but spaced from one another, said central section being in the form of a T-shaped track with flanges on opposite sides of the upright stem of the T, said track having spaced cut-out portions along its length and louver rotatable actuator elements in said cut-out portions, each actuator element being in the form of a T-shaped track similar to the track of said central section, a linkage between each actuator element and a louver of said blind, said linkage including a pair of rollers engaging the underside of the T-shaped track of the associated actuator element, and means for simultaneously aligning the tracks of all of said actuator elements with the tracks of said guideway, to thereby enable movement of said rollers over said guideway.

15. A window blind having vertically arranged louvers, a channeled guideway for said louvers, said guideway having side sections and a central section parallel to but spaced from one another, said central section being in the form of a T-shaped track with flanges on opposite sides of the upright stem of the T, said track having spaced cut-out portions along its length and louver actuator elements in said cut-out portions, each actuator element being in the form of a T-shaped track similar to the track of said central section and having a gear individual thereto, a linkage between each actuator element and a louver of said blind, said linkage including a pair of rollers engaging the underside of the T-shaped track of the associated actuator element, and a common rack engaging the gears of said actuator elements for simultaneously rotating the same, thereby to align the tracks of all of said actuator elements with the track of said guideway and enable movement of said rollers over said guideway.

16. A window blind having vertically arranged louvers, a channeled guideway for said louvers, said guideway having side sections and a central section parallel to but spaced from one another, said central section being in the form of a T-shaped track with flanges on opposite sides of the upright stem of the T, said track having spaced symmetrically positioned and equal length cut-out portions, and louver actuator elements in said cut-out portions, each actuator element being in the form of a T-shaped track similar to the track of said central section, a linkage between each actuator element and a louver of said blind, said linkage including a pair of rollers engaging the underside of the T-shaped track of the associated actuator element, and unicontrol means for rotating said actuator elements, thereby to align the tracks of all of said actuator elements with the track of said guideway and enable movement of said rollers over said guideway.

17. A window blind capable of moving along the arc of a circle, comprising curved upper and lower horizontally positioned channeled guideways adapted to be mounted across a building opening to be served by the blind, said blind having vertically arranged louvers positioned between said guideways and turnable about their vertical axes, means in one of said channeled guideways for pivotally moving said louvers, said means including an actuating gear for each louver and a common curved rack engaging the actuating gears of said louvers, and means causing said vertical louvers to move along the lengths of channeled guideways to thereby collapse said blind.

18. A window blind comprising upper and lower horizontally positioned channeled guideways adapted to be mounted across a building opening to be served by the blind, said blind having vertically arranged louvers positioned between said guideways and turnable about their vertical axes, means in one of said channeled guideways for pivotally moving all of said turnable louvers of said blind, said means including an actuating gear for each louver, a horizontally movable link between each louver and its associated actuating gear, and a common horizontally movable rack engaging the actuating gears of said louvers, there being horizontally movable and pivotal members in said other channeled guideway for linking with said louvers, whereby said louvers are enabled to move horizontally and collapse said blind.

19. In a window blind having a plurality of vertically arranged louvers, a T-shaped track linked to the louver end of each louver for controlling the vertical movement thereof, each of said T-shaped tracks having flanges disposed on opposite sides of the central stem of the T, said flanges of each T sloping inward towards the center of the T, a grip device positioned between each T-shaped track and the louver end of the louver to be controlled thereby, said grip device having its lower end in the form of a U with spaced rollers at the terminations of the legs of the U engaging the underside of the flanges of its associated T-shaped track, means for simultaneously raising or lowering said T-shaped tracks, and means for simultaneously aligning said T-shaped tracks so that their respective flanges are positioned in parallel lines on both sides of the stems of the T-shaped tracks.

20. A window blind comprising upper and lower horizontally positioned channeled guideways adapted to be mounted across an opening to be served by the blind, said blind having vertically arranged louvers positioned between said guideways and turnable about their vertical axes, means in one of said guideways for pivotally moving said louvers, said means including an actuating gear for one end of each of said louvers, and a common rack engaging said actuating gears, means for pivotally supporting the other ends of said louvers in the other guideway, and gear means secured to only one of said guideways to raise and lower the same relative to the other guideway, thereby to variably apply tension to all of said louvers simultaneously, and means linked to said louvers and effective when said tension is released for collapsing said louvers across the width of said blind.

THOMAS ARMSTRONG.

REFERENCES CITED

The following references are of record in the file of this patent:

UNITED STATES PATENTS

| Number | Name | Date |
|---|---|---|
| 1,054,993 | Simon | Mar. 4, 1913 |
| 1,841,065 | Simon | Jan. 12, 1932 |
| 2,030,234 | Villalobos | Feb. 11, 1936 |
| 2,135,647 | Streby | Nov. 8, 1938 |
| 2,158,454 | Zubiria | May 16, 1939 |
| 2,370,794 | Houmere | Mar. 6, 1945 |
| 2,524,372 | Bopp et al. | Oct. 3, 1950 |